(12) United States Patent
Stavropoulos

(10) Patent No.: US 11,792,493 B2
(45) Date of Patent: Oct. 17, 2023

(54) USE OF WATERMARKING TO CONTROL ABANDONMENT OF DYNAMIC CONTENT MODIFICATION

(71) Applicant: Roku, Inc., San Jose, CA (US)

(72) Inventor: John S. Stavropoulos, Edison, NJ (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 17/658,401

(22) Filed: Apr. 7, 2022

(65) Prior Publication Data

US 2022/0232296 A1 Jul. 21, 2022

Related U.S. Application Data

(63) Continuation of application No. 17/301,705, filed on Apr. 12, 2021, now Pat. No. 11,343,593, which is a continuation of application No. 15/929,212, filed on Jan. 29, 2020, now Pat. No. 11,006,191.

(60) Provisional application No. 62/882,220, filed on Aug. 2, 2019.

(51) Int. Cl.
*H04N 21/8358* (2011.01)
*H04N 21/2389* (2011.01)
*H04N 21/81* (2011.01)
*H04N 21/24* (2011.01)
*H04N 21/234* (2011.01)

(52) U.S. Cl.
CPC ... *H04N 21/8358* (2013.01); *H04N 21/23424* (2013.01); *H04N 21/23892* (2013.01); *H04N 21/2407* (2013.01); *H04N 21/812* (2013.01); *H04N 21/814* (2013.01)

(58) Field of Classification Search
CPC .................................................. H04N 21/8358
See application file for complete search history.

(56) References Cited

U.S. PATENT DOCUMENTS

| 3,993,955 A | 11/1976 | Belcher et al. |
| 6,298,218 B1 | 10/2001 | Lowe et al. |
| 10,419,806 B1 | 9/2019 | Nijim et al. |

(Continued)

FOREIGN PATENT DOCUMENTS

JP    2011-55206 A    3/2011

OTHER PUBLICATIONS

Office Action in U.S. Appl. No. 16/947,182, dated Apr. 29, 2021.

(Continued)

*Primary Examiner* — Michael H Hong
(74) *Attorney, Agent, or Firm* — Sterne, Kessler, Goldstein & Fox P.L.L.C.

(57) ABSTRACT

The disclosure provides for use of watermarking as a basis control abandonment of dynamic content modification. Upon detecting of the occurrence of a trigger event for causing a content presentation device to abandon a dynamic content modification with respect to a media stream being delivered to the content presentation device, an entity encodes into the media stream an abandonment-watermark interpretable by the content presentation device to cause the content presentation device to abandon the dynamic content modification. The content presentation device then detects the abandonment-watermark in the media stream being received by the content presentation device and in response to the abandonment-watermark, abandons the dynamic content modification.

20 Claims, 7 Drawing Sheets

(56) References Cited

U.S. PATENT DOCUMENTS

| | | | |
|---|---|---|---|
| 11,006,191 | B2 | 5/2021 | Stavropoulos |
| 11,343,593 | B2 | 5/2022 | Stavropoulos |
| 2003/0093788 | A1 | 5/2003 | Takenaka |
| 2006/0005219 | A1 | 1/2006 | Owens |
| 2008/0250453 | A1 | 10/2008 | Smith et al. |
| 2010/0088697 | A1 | 4/2010 | Clardy et al. |
| 2010/0211972 | A1 | 8/2010 | Howarter et al. |
| 2012/0117584 | A1 | 5/2012 | Gordon |
| 2014/0086563 | A1 | 3/2014 | Cole et al. |
| 2014/0181243 | A1 | 6/2014 | Nieuwenhuys |
| 2014/0196071 | A1 | 7/2014 | Terpstra et al. |
| 2014/0282703 | A1 | 9/2014 | Garg |
| 2016/0182973 | A1* | 6/2016 | Winograd .......... H04N 21/8358 725/25 |
| 2017/0070789 | A1 | 3/2017 | Liassides et al. |
| 2017/0134466 | A1 | 5/2017 | Giladi |
| 2017/0311049 | A1 | 10/2017 | Kwak et al. |
| 2018/0035174 | A1 | 2/2018 | Littlejohn |
| 2018/0220169 | A1 | 8/2018 | Yang et al. |
| 2018/0242052 | A1 | 8/2018 | Ng et al. |
| 2018/0376156 | A1 | 12/2018 | Deshpande et al. |
| 2019/0007712 | A1 | 1/2019 | Venkatraman et al. |
| 2019/0174204 | A1* | 6/2019 | Deshpande ...... H04N 21/23614 |
| 2019/0313134 | A1 | 10/2019 | Fahnestock et al. |
| 2019/0356965 | A1 | 11/2019 | Winograd et al. |
| 2019/0379945 | A1 | 12/2019 | Rivera |
| 2021/0037294 | A1 | 2/2021 | Stavropoulos |
| 2022/0030324 | A1 | 1/2022 | Stavropoulos |

OTHER PUBLICATIONS

International Preliminary Report on Patentability from International Application No. PCT/US2020/044762, dated Feb. 8, 2022.

International Search Report and Written Opinion from International Application No. PCT/US2020/044762, 11 pages, dated Nov. 13, 2020.

Office Action in U.S. Appl. No. 16/947,182, 10 pages, dated Jul. 30, 2021.

Office Action in U.S. Appl. No. 16/947,182, 9 pages, dated Oct. 28, 2021.

Office Action in U.S. Appl. No. 16/947,182, 10 pages, dated Mar. 18, 2022.

Extended European Search Report for Application No. 20849774.3 dated Apr. 26, 2023, 10 pages.

* cited by examiner

USE OF WATERMARKING TO CONTROL ABANDONMENT OF DYNAMIC CONTENT MODIFICATION

REFERENCE TO RELATED APPLICATIONS

This is a continuation of U.S. patent application Ser. No. 17/301,705, filed Apr. 12, 2021, which is a continuation of U.S. patent application Ser. No. 15/929,212, filed Jan. 29, 2020, which claims priority to U.S. Provisional Patent Application No. 62/882,220, filed Aug. 2, 2019, the entirety of each of which is hereby incorporated by reference.

BACKGROUND

A typical content presentation device operates to receive an analog or digital media stream representing media content such as video and/or audio content and to render and present the media content on a user interface such as a display screen and/or an audio speaker. Examples of such devices include, without limitation, televisions, computer monitors, projection systems, loudspeakers, headphones, and the like.

In many cases, such a content presentation device may be in communication with a receiver, such as a local set top box or other similar device or a remote server, that has access to numerous discrete channels of media content and that can selectively deliver a given such channel's media content to the content presentation device for playout.

By way of example, a television may be communicatively linked by a High-Definition Multimedia Interface (HDMI) cable or other interface with a cable-TV set top box that has access to a set of cable-TV or satellite-TV channels, and the set top box may be configured to receive user input selecting a particular channel and to responsively tune to the selected channel and output to the television the media content of the selected channel, for presentation of the media content to a user. As another example, a loudspeaker may be communicatively linked with a radio that has access to a set of radio stations, and the radio may be configured to receive user input selecting a particular channel (station) and to responsively tune to the selected channel and output to the loudspeaker the media content of the selected channel, for presentation of the media content to a user. And as still another example, a content presentation device such as a display or speaker may be communicatively linked with a computer that has access to a myriad of online streaming media channels, and the computer may be configured to receive user input selecting a particular channel and to responsively initiate receipt and output of the selected media content and provide the media content to the display and/or speaker for presentation to a user.

SUMMARY

When a content presentation device receives and renders a media stream, the content presentation device may not have an indication of which channel the media stream represents and thus which channel of media content the content presentation device is rendering. A receiver, server, or other device that selectively tunes to the channel and provides the media stream of the channel to the content presentation device may have such information, but the content presentation device that receives the media content from that other device may not have such information. For example, if a television is coupled with a cable-TV set top box and a user selects a particular cable channel on the set top box, the set top box may thereby have an indication of the selected channel as the channel on which the set top box is then receiving a media content that is being output to the television. But the television itself may merely receive and render the media content and may have no indication of the selected channel.

For various reasons, however, it may be useful to determine which of various channels is the channel being rendered by a content presentation device. Further, it may be useful to do so without receiving from a channel-selection device (e.g., receiver or remote control) a report of the channel to which that device is tuned, and perhaps without any involvement of the channel-selection device. For instance, it may be useful for the content presentation device itself, and/or a network server working in cooperation with the content presentation device, to determine the channel based on an evaluation of the media content that is being rendered by the content presentation device.

Given knowledge of the channel that the content presentation device is rendering, the network server and/or another entity could then carry out one or more operations keyed to the channel, such as determining and recording an extent to which media content of that channel is being played, selectively replacing a predetermined portion of the media content with alternative content (such as dynamically inserting a replacement advertisement), or superimposing channel-specific content over the media content for presentation along with the media content, among numerous other possibilities.

One method to determine the channel that the content presentation device is rendering is to apply fingerprint-based automatic content recognition (ACR). With fingerprint-based ACR, an entity could be provisioned with reference data that includes digital reference fingerprints respectively representing each of various known channels of media content (e.g., each of the channels within a subscription plan for a set-top box that supplies media content to the content presentation device) and that maps the reference fingerprints to the respective channels that they represent. Further, the entity could be provided with digital query fingerprints that represent the media content currently being rendered by the content presentation device, and the entity could compare the query fingerprints with the reference fingerprints in an effort to find a match. Upon finding that the query fingerprints match the reference fingerprints mapped to a particular channel, the entity could thus determine that the channel being rendered by the content presentation device is that particular channel.

In an example implementation of fingerprint-based ACR, a content distribution system that is configured to distribute various known channels of media content to content presentation devices could regularly provision an ACR server (e.g., fingerprint-matching server) with reference data to enable the ACR server to conduct the fingerprint analysis. In particular, for each of various channels, the content distribution system could generate timestamped reference fingerprints on a per-frame basis or other ongoing basis and could regularly transmit the reference fingerprints to the ACR server along with information mapping each reference fingerprint to the channel that it represents.

Further, as the content presentation device receives and renders a media stream representing a given channel of media content, the content presentation device could generate the timestamped query fingerprints of the media content on a pre-frame basis or other ongoing basis and could regularly transmit the generated query fingerprints to the ACR server for analysis.

On an ongoing basis or in response to one or more trigger events, the ACR server could thus compare the query fingerprints provided by the content presentation device with the reference fingerprints provided by the content distribution system. And upon finding with sufficient certainty that the query fingerprints match reference fingerprints that the reference data maps to a particular channel, the ACR server could reasonably conclude that that is the channel being rendered by the content presentation device.

In a representative implementation, determining the channel that the content presentation device is rendering could help facilitate dynamic content modification, such as targeted advertisement replacement.

By way of example, once the ACR server has determined the channel that the content presentation device is rendering, the ACR server or another entity could then use that determined channel identity as a basis to detect when a content-modification opportunity is about to occur on that channel. And the ACR server or other entity could then responsively cause the content presentation device to carry out a content modification at the time of the content-modification opportunity.

This example channel-specific action could take advantage of a time delay that is likely to exist from the point in time when the content distribution system outputs media content of the channel for transmission to the content presentation device to the point in time when the content presentation device renders that media content. Depending on the configuration of the system, this delay could be on the order of 5-10 seconds.

Given that delay, it could be possible for the content distribution system, the ACR server, and/or one or more other entities to detect the presence of particular content defining a content-modification opportunity on the channel that is en route to the content presentation device well enough before that content arrives at the content presentation device. By engaging in relatively quick out-of-band (e.g., Internet Protocol (IP) based) communication with the content presentation device during that delay period, a server could then prepare the content presentation device to engage in content modification with respect to the detected content, so that when the detected content ultimately arrives at the content presentation device, the content presentation device could carry out the content modification in a timely manner.

As to content modification, for instance, the ACR server could be provisioned in advance with modifiable-content segment data that includes digital fingerprints respectively representing each of various modifiable content segments of media content, along with associated metadata per modifiable content segment, such as a duration of the segment, an identifier of the segment, a type of associated content modification (e.g., replacement or overlay) and the like. For instance, a content management system could generate and provide this information in advance to the ACR server.

Having identified the channel being rendered by the content presentation device, the ACR server could then compare the ongoing reference fingerprints representing that identified channel with the fingerprints representing the various modifiable content segments. And upon finding with sufficient certainty that the reference fingerprints of the identified channel match the fingerprints representing a particular modifiable content segment, the ACR server could reasonably conclude that the media content en route to the content presentation device includes that modifiable content segment. Further, the ACR server could thereby determine from the reference data of the identified channel the frame-timestamp or other timing information indicating when the modifiable content segment is present on the channel.

Upon so detecting the presence of a modifiable content segment in the media content of the channel en route to the content presentation device, the ACR server and/or another entity could then responsively engage in out-of-band signaling with the content presentation device to enable and cause the content presentation device to perform a content modification with respect to that modifiable content segment.

For instance, the ACR server could provide the content presentation device with timing information regarding the upcoming content modification opportunity. The timing information regarding the upcoming content modification opportunity could include frame-timestamp information or other timing information that informs the content presentation device when the modifiable content segment will be present on the channel of media content that the content presentation device is receiving and rendering. For example, this could include a frame-timestamp of the start of the modifiable content segment on the channel and a duration of the modifiable content segment and/or frame-timestamp of the end of the modifiable content segment on the channel. With this timing information, the content presentation device could accordingly plan to carry out a content modification at the time of the modifiable content segment.

Further, the ACR server could provide the content presentation device with various other information regarding the modifiable content segment, to enable the content presentation device to carry out the content modification at the indicated time of the modifiable content segment. For instance, the ACR server could provide the content presentation device with metadata as described above, such as a duration of the segment, an identifier of the segment, and a type of associated content modification (e.g., replacement or overlay) and the like.

With this information, the content presentation device could then responsively work with the content management system and/or another entity to obtain details of the content modification to perform with respect to the upcoming modifiable content segment. For instance, the content presentation device could transmit to the content management system a request that provides the content management system with the modifiable content segment identifier and other associated metadata about the modifiable content segment. And the content management system could responsively provide the content presentation device with information to facilitate the content modification.

The content management system could use various information as a basis to determine supplemental content that the content presentation device should render in place of or as an overlay superimposed on the modifiable content segment. For instance, the content management system could use user-demographics, location, and/or other information regarding the content presentation device as a basis to determine appropriate supplemental content.

Further, the content management system could ascertain a storage location of determined supplemental content and could provide the content presentation device with an indication of that storage location. For instance, the content management system could query a supplemental-content delivery system to determine a uniform resource locator (URL) or other address from which the content presentation device could obtain the supplemental content from a network server or from local data storage of the content presentation device. And the content management system could provide the content presentation device with that address and/or with other information to enable the content presentation device to obtain the supplemental content, or the content management system could itself provide the content presentation device with the supplemental content.

With this information, the content presentation device could thus obtain the supplemental content and could plan to present the supplemental content (e.g., as replacement or overlay) at the time of the modifiable content segment on the channel that the content presentation device is rendering.

The content-modification process described so far could be carried out for various purposes. Without limitation, for instance, the content-modification process could be carried out to facilitate dynamic advertisement insertion (DAI), in which the content presentation device replaces a generally applicable ad (e.g., a nationally broadcast ad) with a replacement ad possibly selected based on location, user demographics, and/or other information specific to the content presentation device.

For DAI, an entity such as content broadcaster, distributor, or ad-replacement service might enter into agreements with advertisers to facilitate replacing playout of certain ads, deemed "replaceable ads," with different ads, deemed "replacement ads." For each of various replaceable ads, the content management server or other entity could then receive a copy of the replaceable ad and could provision the ACR server with digital fingerprints representing the replaceable ad and with associated data regarding the replaceable ad. For instance, for each replaceable ad, the content management server could generate digital fingerprints of the replaceable ad on a per-frame basis or the like and could transmit to transmit to the ACR server the generated fingerprints of the replaceable ad along with metadata as described above, such as a unique identifier of the replaceable ad, a duration of the replaceable ad, an indication that the ad is to be replaced, and so forth. (Further, the data provided to the ACR server could include a traffic schedule that indicates when specific ads, with particular identifiers and associated fingerprints, are scheduled to be presented on each of one or more channels.)

Once the ACR server has identified the channel being rendered by the content presentation device, the ACR server could then responsively compare the reference fingerprints representing that identified channel with the fingerprints representing various replaceable ads. And upon finding with sufficient certainty that the reference fingerprints of the identified channel match the fingerprints representing a particular replaceable ad, the ACR server could reasonably conclude that the channel being rendered by the content presentation device includes the replaceable ad, and more specifically that the media content en route to the content presentation device includes that replaceable ad.

In response to this conclusion, the ACR server and/or another entity could engage in signaling with the content presentation device to prepare the content presentation device to present a replacement ad in place of the replaceable ad. In line with the discussion above, for instance, the ACR server or other entity could transmit to the content presentation device, through out-of-band signaling, one or more messages that provide the content presentation device with (i) a frame-timestamp or other information that indicates when the replaceable ad will occur on the channel that the content presentation device is rendering, (ii) the unique identifier and duration of the replaceable ad, and (iii) reference fingerprints of representing frames of the channel at least up to and through the time of that the replaceable ad will occur.

Given the identifier and duration of the replaceable ad, the content presentation device could then engage in out-of-band signaling with the content management system to ascertain a replaceable ad that the content presentation device should render in place of the replaceable ad. Here, the content presentation device might provide the content management system with a user identification, demographics, location, and/or other information that the content management system could use as a basis to select an appropriate replacement ad. Further, the content management system could use the duration of the replaceable ad, indicated by the content presentation device or mapped to the ad-identifier of the replaceable ad for instance, to select a replacement ad that is of the same duration as the replaceable ad.

The content management system could then work with the supplemental-content delivery system to determine a URL or other address or location from which the content presentation device could obtain the replacement ad and could inform the content presentation device accordingly. And the content presentation device could thus obtain the replacement ad and plan to render it in place of the replaceable ad on the channel that the content presentation device is rendering, as discussed above.

A technical difficulty that can arise with these or other dynamic content modification processes is that, once a decision has been made for the content presentation device to apply a content modification, an event may occur that justifies abandoning the content modification. For example, if emergency content, such as a breaking news report or emergency alert, occurs in the media stream that the content presentation device is receiving, it may be best for the content presentation device to avoid or discontinue modifying content of that media stream, so that the content presentation device can present the emergency content. As another example, if the channel represented by the media stream being received by the content presentation device changes (e.g., if a user changes the channel), it may likewise be best for the content presentation to avoid or discontinue modifying content of the media stream, since the media stream may no longer include the determined content-modification opportunity.

At issue when such an event occurs is then how to cause the content presentation device to abandon dynamic content modification that is planned or in-process.

The present disclosure provides for use of watermarking as a mechanism to facilitate abandonment of dynamic content modification. In accordance with the disclosure, when an event occurs that justifies having a content presentation device abandon planned or in-process dynamic content modification, a special abandonment-watermark will be encoded into the media stream that is en route to the content presentation device. The content presentation device will then detect the presence of the abandonment-watermark in the media stream that the content presentation device is receiving, and the content presentation device will respond to the detected abandonment-watermark by abandoning the dynamic content modification.

By way of example, when an emergency alert occurs in the media stream that is en route to the content presentation device, an entity involved with providing that media stream could encode the abandonment-watermark into the media stream.

For instance, an entity that inserts the emergency alert into the media stream could encode the abandonment-watermark into the media stream as well. Or another entity could detect or learn of the presence of emergency alert in the media stream, such as by monitoring the media stream for the presence of one or more predefined tones (e.g., Emergency Alert System (EAS) tones) or other audio signals indicative of an emergency alert and could responsively encode, or cause to be encoded, into the media stream the abandonment-watermark, perhaps coincident with or proximate to the detected audio signal(s). As the content presentation device is receiving the media stream, the content presentation device could then detect the encoded abandonment-watermark and could responsively abandon dynamic content modification, so as to allow unmodified presentation of the emergency alert.

As another example, an entity involved with providing the media stream to the content presentation device could detect or learn when the channel represented by that media stream changes and could responsively encode the abandonment-watermark into the media stream.

The entity that detects or learns when the channel represented by the media stream changes could be any entity that is aware of and/or involved with channel selection. For instance, the entity could be a set top box that serves the content presentation device, or the entity could be a streaming-content service provider (such as a virtual multichannel video program distributor (virtual-MVPD) that streams a selected channel to a receiver serving the content presentation device, among other possibilities. Upon change of the channel represented by the media stream, such an entity could encode the abandonment-watermark into the media stream. And as the content presentation device is receiving the media stream, the content presentation device could then detect the abandonment-watermark and responsively abandon dynamic content modification so as to allow the new channel to be presented.

With these or other implementations, the content presentation device could detect the abandonment-watermark within the media stream at any time between when the content presentation device begins planning for a dynamic content modification (e.g., once it has received an initial directive to carry out the dynamic content modification) and when the content presentation device would finish carrying out the dynamic content modification. And the content presentation device could respond to the detected abandonment-watermark by abandoning the dynamic content modification, such as by not carrying out a content modification that is being planned or by discontinuing a content modification that is occurring.

Considering the example dynamic content modification process described above, for instance, the content presentation device might detect the abandonment-watermark between (i) the time when the content presentation device receives from the ACR server timing information and/or other information about an upcoming content modification opportunity and (ii) the time when the upcoming content modification opportunity would start. In that case, the content presentation device could then respond to the detected abandonment-watermark by abandoning its plans to start the content modification and by thus not starting the content modification. For example, depending on where the content presentation device is in the planning process before starting the content modification, the content presentation device might thereby forgo further operations such as working with a content management system and/or other entity to obtain details of the content modification to perform, and/or obtaining supplemental content such as replacement or overlay content.

Alternatively, the content presentation device might detect the abandonment-watermark while the content presentation device is currently rendering the content modification, such as while the content presentation device is rendering replacement or overlay content. In that case, the content presentation device could then respond to the detected abandonment-watermark by discontinuing the content modification and thus reverting to rendering of the underlying media stream without completing the content modification.

In an example implementation, the abandonment-watermark could be a watermark that encodes a predefined data value, or a value of a predefined format, that is interpretable by the content presentation device to trigger abandonment of dynamic content modification. Thus, as the content presentation device is receiving and rendering a media stream, the content presentation device could monitor the media stream for the presence of a watermark that encodes that particular data value. The content presentation device might start monitoring for presence of this abandonment-watermark once the content presentation device starts planning for a dynamic content modification, such as once the content presentation device receives from an ACR server or the like signaling related to an upcoming content modification opportunity. Upon detecting in the media stream a watermark that encodes the value interpretable by the content presentation device to trigger abandonment of dynamic content modification, the content presentation device could then responsively abandon the dynamic content modification.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
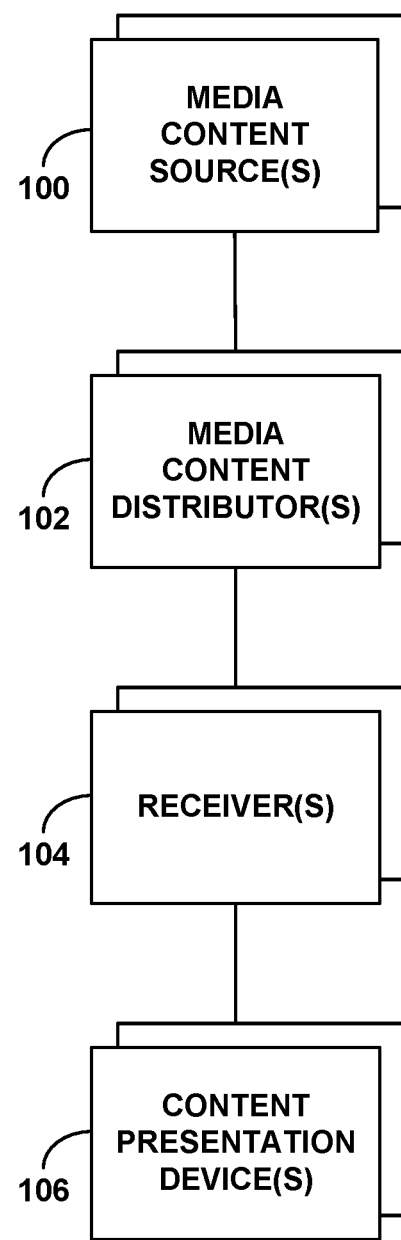
FIG. 1 is a simplified block diagram of an example system in which various disclosed principles can be applied.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 100 (e.g., broadcasters, web servers, etc.), one or more media content distributors 102 (e.g., multi-channel distributors, such as cable providers, satellite providers, over-the-air broadcast providers, web aggregators, etc.), one or more media content receivers 104 (e.g., cable receivers, satellite receivers, over-the-air broadcast receivers, computers or other streaming media receivers, etc.), and one or more clients or content presentation devices 106 (e.g., televisions or other display devices, loudspeakers or other audio output devices, etc.)

In practice, for instance, the media content sources 100 could be national broadcasters, such as ABC, NBC, CBS, FOX, HBO, and CNN, the media content distributors 102 could be local affiliates and/or other local content distributors, possibly for specific designated market areas (DMAs), and the receivers 104 and content presentation devices 18 could then be situated at customer premises, such as homes or business establishments.

With this or other arrangements, the content sources 100 could deliver media content to the content distributors 102 for distribution to receivers 104 at customer premises, and the content distributors could distribute the media content to the receivers 104 as particular channels of content (e.g., particular frequencies, particular streaming media sessions, or other defined channels). Each receiver could then respond to user input or one or more other triggers by tuning to or otherwise starting to receive a selected channel and outputting to a content presentation device 106 a media stream representing media content of the selected channel. And the content presentation device 106 could receive and render the media content (e.g., display or otherwise present the content).

By way of example, the content presentation device could be a television situated at customer premises, which could be coupled by an HDMI cable with a cable-TV set top box, and the set top box could be coupled through a local distribution network with a cable-TV head end that distributes various television channels provided by national and/or local broadcasters. In this arrangement, the television could regularly receive a media stream via HDMI from the set top box, and the set top box could tune to a particular channel from the head end in response to user input, so that the media stream arriving at the television would then represent the user-selected channel.

And as another example, a television situated at customer premises could alternatively be connected by an HDMI cable with a streaming-media receiver such as an APPLE TV, ROKU, AMAZON FIRE, or CHROMECAST device, or a computer or other device, which could be in network communication with a streaming-media server such as virtual-MVPD that distributes various channels of content. In this arrangement, the television could regularly receive a media stream via HDMI from the streaming-media receiver, and the streaming-media receiver could work with the streaming-media server to cause the streaming-media server to deliver to the streaming-media receiver a particular user-selected channel, which the streaming-media receiver could output in its media stream to the television. Thus, here too, the media stream arriving at the television would likewise represent the user-selected channel.

In this or other arrangements, as noted above, as the content presentation device receives and renders this media stream, the content presentation device may have no indication of the channel represented by the media stream. Rather, the content presentation device may be configured simply to receive the media stream from the receiver and to render the content of the media stream. Per the present disclosure, however, the content presentation device may be in communication with a network server and may work with the network server to facilitate identification of the channel and thus to facilitate taking useful channel-specific action.

Figure 2:
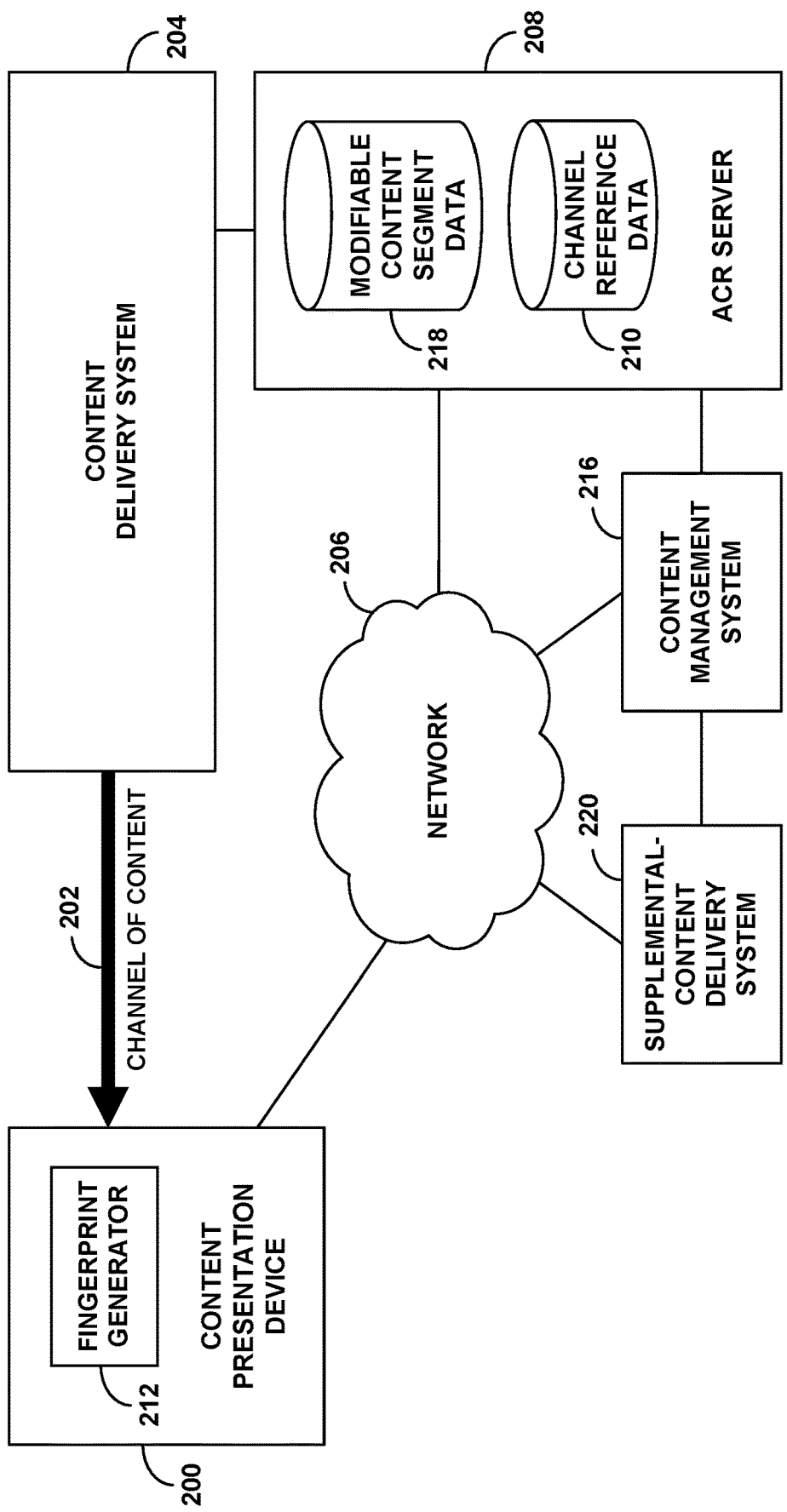
FIG. 2 is another simplified block diagram of an example system in which various disclosed principles could be applied.

FIG. 2 illustrates more specifically an example system in which some of the presently disclosed features could be implemented.

FIG. 2 shows at its top a representative content presentation device 200 receiving a channel of content 202 being provided by a content delivery system 204. By way of example, the content presentation device 200 could be an example content presentation device 100 as shown in FIG. 1, and the content delivery system 204 could comprise a representative media content source 100, media content distributor 102, and/or receiver 104 as shown in FIG. 1.

As such, the content presentation device 200 could be receiving and rendering the channel of content 202 in a media stream directly or indirectly from the content delivery system 204. The channel might be a linear broadcast feed and/or might be a streaming media channel, and the content presentation device might be receiving the channel through any of a variety of distribution channels, such as but not limited to cable, satellite, terrestrial over-the-air broadcast, broadband streaming, or others now known or later developed.

In an example implementation, the media content of the channel could define a sequence of digital frames of media content that the content presentation device is configured to render for presentation to a user. A media content source, media content distributor, and/or other entity might be broadcasting, streaming, or otherwise providing this sequence of frames encapsulated in a transport stream for receipt by receiver that is currently set to receive the channel of content, and the receiver may be extracting the sequence of frames from the transport stream and outputting the sequence of frames as the media stream for receipt and rendering by the content presentation device.

As further shown in FIG. 2, the content presentation device 200 is interconnected with a communication network 206, which could be a packet-switched network such as the Internet. For instance, the content presentation device 200 may sit as a node on a local area network (LAN) at customer premises, with the content presentation device having an assigned Internet Protocol (IP) address on the LAN and the LAN having an IP address on the network 206. The content presentation device 200 could thus engage in data communication with various entities via the network 206 while the content presentation device 200 is receiving and rendering the media stream representing the channel of content 202 provided by the content delivery system 204.

Shown accessible via the network 206 (e.g., at a defined IP address on the network) is a ACR server 208, which as noted above could operate to engage in fingerprint-based ACR processing. With this network arrangement, the content presentation device 200 could engage in IP communication with the ACR server 206 via network 206, providing the ACR server 208 with query fingerprints representing the media content of the channel 202 that the content presentation device 200 is rendering. And the ACR server could compare those query fingerprints with reference fingerprints of various known channels, in an effort to determine the channel 202 that the content presentation device 200 is rendering.

As discussed above, the ACR server 208 could be provisioned with reference data 210 that includes reference fingerprints respectively representing each of various channels accessible to the content presentation device 200. As noted above, for instance, content distribution system 204 could generate and provide this reference data to ACR server on an ongoing basis for each of various such channels. For instance, as to each channel of media content that the content distribution system outputs, the content distribution system could generate timestamped digital reference fingerprints of frames of the media content on a per frame basis or other ongoing basis, using any digital fingerprinting process now known or later developed, and could provide the ACR server with the timestamped digital reference fingerprints along with data identifying the associated channel.

Without limitation, an example digital fingerprinting process as to video content could apply on a per video frame basis and could involve establishing a representation of luminosity and/or other video characteristics. For instance, for a given video frame, a fingerprint generator could programmatically divide the frame into a grid, and the fingerprint generator could measure luminosity of the frame per grid cell and generate a bit string with each bit or series of bits representing luminosity of a respective grid cell, or representing a weighted difference between the luminosity of certain defined pairs of the grid cells, or the like. Further, the fingerprint generator could apply this process continually to generate the digital fingerprint over time as a sequence of fingerprints (e.g., as a fingerprint stream). For instance, the fingerprint generator could apply this process to each frame, to each key frame, periodically, or on another defined basis, with each frame's bit string defining a digital fingerprint and/or with a specified hash, combination or series of such bit strings or other representative values defining a digital fingerprint, on a sliding window basis. Other digital fingerprinting processes could be used as well.

As the ACR server 208 receives this reference data including the generated reference fingerprints along with associated data, the ACR server 208 could store the reference data in a relational database or other form suitable for ready searching and access.

The content presentation device 200 in an example implementation could be equipped with a fingerprint generator 212 (e.g., program instructions executable by a processor of the content presentation device 200), which is configured to generate query fingerprints representing the media content of the channel 202 that the content presentation device 200 is currently rendering. The fingerprint generator 212 could be configured to receive as input a copy of the media content of the channel as the media content arrives at the content presentation device 200 and/or is processed for presentation by the content presentation device 200, and the fingerprint generator 212 could be configured to generate the query fingerprints of the media content on a per frame basis or other ongoing basis, using the same digital fingerprinting process used to generate the reference fingerprints, so as to facilitate a comparison of the query fingerprints with the reference fingerprints.

Further, the content presentation device 200 could be configured to transmit its generated query fingerprints via network 206 to the ACR server 208 for analysis, to facilitate fingerprint-based ACR and associated channel-specific action. By way of example, the content presentation device 200 could be configured to periodically or from time to time transmit to the server the query fingerprints representing a latest series of frames of the channel being rendered by the content presentation device 200. For instance, the content presentation device 200 could generate a message carrying the latest generated query fingerprints, along with one or more timestamps and/or other associated data, and could transmit the message to the IP of the ACR server 208 for analysis.

As noted above, given the query fingerprints representing media content of the channel 202 being rendered by the content presentation device 200, and given the reference data including reference fingerprints respectively representing each of various known channels, the ACR server 208 could engage in fingerprint-based ACR processing. In particular, as noted, the ACR server could compare the query fingerprints with the reference fingerprints in an effort to find a match.

To compare a given query fingerprint with a given reference fingerprint, the ACR server 208 could compare corresponding portions of the fingerprints with each other to determine whether the portions match exactly or within defined tolerances. For example, the ACR server 208 could compute a maximum deviation between the fingerprints and determine if the maximum deviation is within a predefined tolerance. Further, if the fingerprints are binary, this could be a Boolean determination or could involve computing a Hamming distance (as a count of mismatches between respective bit locations in the fingerprints), and if the fingerprints are more complex values, such as decimal values or vectors (e.g., grey values per video frame region), this could involve determining a distance between the values or vectors. Numerous other examples are possible as well.

Upon finding with sufficient certainty that the query fingerprints match the reference fingerprints of a particular channel, the ACR server 208 could then conclude that that is the channel being rendered by the content presentation device 200.

And as further noted above, based on this identification of the channel being rendered by the content presentation device, the ACR server 208 could then take or cause to be taken one or more useful channel-specific actions.

For present purposes, for instance, the ACR server 208 could then responsively engage in processing to detect a modifiable content segment, such as a replaceable ad, in the channel that the content presentation device is receiving and to responsively prepare and cause the content presentation device to engage in content modification (e.g., DAI) with respect to that modifiable content segment.

As noted above, for instance, a content management system 216 may have provisioned the ACR server 208 in advance with modifiable content segment data 218, including fingerprints of each of various modifiable content segments (e.g., replaceable ads) and with associated metadata, including an identifier of each modifiable content segment for instance. Thus, having identified the channel being rendered by the content presentation device 200, the ACR server 208 could then responsively commence comparing the reference fingerprints of that identified channel with the fingerprints of the various modifiable content segments in an effort to find a match. And upon finding with sufficient certainty that the identified-channel reference fingerprints match the fingerprints of a specific modifiable content segment, the ACR server 208 could then engage in signaling to enable and prepare the content presentation device 200 to carry out a content modification with respect to that modifiable content segment.

For instance, the ACR server could provide the content presentation device 200 with various data as noted above regarding the upcoming modifiable content opportunity, including timing information and other content-modification information for example, to enable the content presentation device 200 to obtain supplemental content.

The content presentation device 200 could then engage in signaling via network 206 with the content management system 216 and perhaps with a supplemental-content delivery system 220, as discussed above, to ascertain and obtain supplemental content (e.g., a replacement ad). And the content presentation device could carry out the content modification with respect to the modifiable content segment.

As noted above, the present disclosure provides a mechanism for use of watermarking to facilitate abandonment of dynamic content modification. This mechanism could be applied in any of a variety of dynamic content modification scenarios. Without limitation, for instance, the mechanism could be applied in connection with the above-described dynamic content modification process, such as with DAI.

Figure 3:
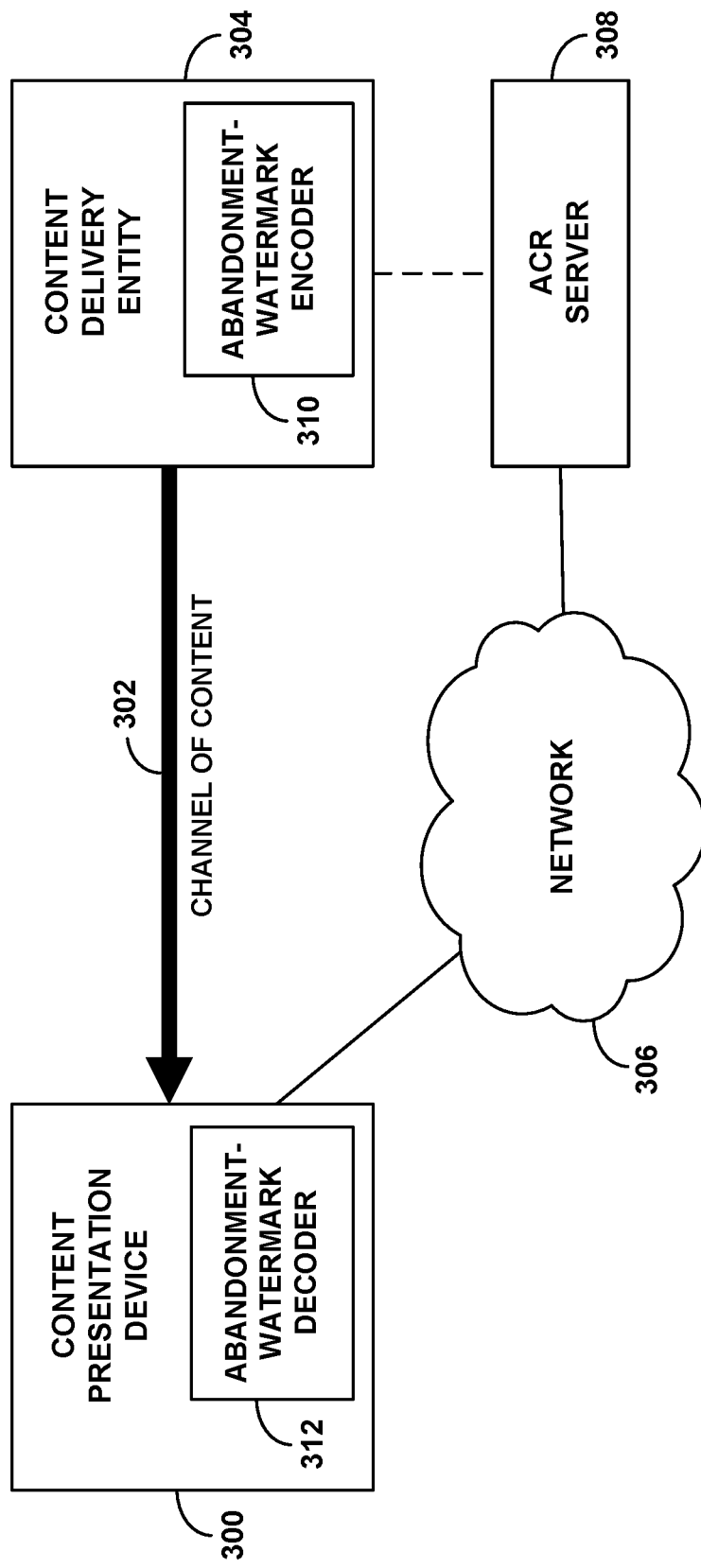
FIG. 3 is a simplified block diagram illustrating components that could be involved in an example implementation.

FIG. 3 is a simplified block diagram illustrating components that could be involved in an example implementation. In particular, FIG. 3 illustrates a content presentation device 300, a content delivery entity 304, and an ACR server 308.

Here, the content presentation device 300 and the ACR server 308 could be examples of the content presentation device 200 and the ACR server 208 discussed above. For instance, the content presentation device 300 could be a television located at customer premises, and the ACR server 308 could be a network server configured to carry out fingerprint matching, content identification, and triggering of dynamic content modification as discussed above, and the content presentation device 300 and ACR server 308 could communicate with each other via a network 306 such as the Internet.

The content delivery entity 304 could then be any entity that is involved with delivery of a media stream representing a channel of content 302 directly or indirectly to the content presentation device 300. For instance, the content delivery entity 304 could be a source of the media stream and/or an entity that sits within a communication path through which the media stream passes en route to the content presentation device 300.

Without limitation, for example, the content delivery entity 304 could be set top box or other receiver that is locally connected with the content presentation device 300. As noted above, such an entity could be configured to selectively receive a user-selected channel of content from a content distributor such as a head end or virtual-MVPD and to deliver to the content presentation device 300 a media stream representing that channel of content. And as another example, the content delivery entity 304 could be a media content source or media content distributor, which as noted above could provide a media stream representing a channel of content for delivery to a receiver serving the content presentation device 300. Other examples are possible as well.

FIG. 3 depicts a dashed line between the content delivery entity 304 and the ACR server 308, to represent that these components might be in communication with each other, as discussed above.

As further shown in FIG. 3, the content delivery entity 304 could include an abandonment-watermark encoder 310, and the content presentation device 300 could include an abandonment-watermark decoder 312. Each of these components could comprise software stored in data storage and executable by a processing unit and/or could take other forms.

In operation, abandonment-watermark encoder 310 could function to encode an abandonment-watermark into a media stream that is being delivered (e.g., is now being delivered or will be delivered) to the content presentation device 300. And the abandonment-watermark decoder 312 could function to decode an abandonment-watermark from a media stream that the content presentation device 300 is receiving.

As is known in the art, watermarking involves permanently embedding or otherwise encoding information into media content in a manner that enables the information to be decoded and extracted from the media content by a receiver of the media content but that may be imperceptible to a user to whom the media content is presented. This is in contrast to inserting such information into a packet header or the like without encoding the information into the underlying media content itself. Watermarking may permanently changes the media content and be impossible to remove.

More particularly, watermarking media content could involve encoding into the media content a code that can be mapped to associated information, or perhaps more directly encoding into the media content the associated information. In an example implementation, the watermark code could be on the order of 24 bits, and the watermarking could be done in an audio component of the media content and/or in a video component of the media content, depending on the form of the media content for instance.

Existing audio watermarking techniques include, without limitation, inserting audio energy into the audio signal or otherwise adjusting one or more characteristics of the audio signal in a manner that can be detected by a suitably configured watermark-detection algorithm but that is masked from hearing (e.g., the audio characteristic and/or manner of encoding being sufficient to hide the watermark from human detection)—known as stenographic or psychoacoustic encoding.

Examples of audio watermarks and corresponding watermark detection techniques are described in U.S. Pat. No. 8,359,205 (entitled "Methods and Apparatus to Perform Audio Watermarking and Watermark Detection and Extraction," which issued on Jan. 22, 2013), U.S. Pat. No. 8,369,972 (entitled "Methods and Apparatus to Perform Audio Watermarking Detection and Extraction," which issued on Feb. 5, 2013), U.S. Patent Application Pub. No. 2010/0223062 (entitled "Methods and Apparatus to Perform Audio Watermarking and Watermark Detection and Extraction," which was published on Sep. 2, 2010), U.S. Pat. No. 6,871,180 (entitled "Decoding of Information in Audio Signals," which issued on Mar. 22, 2005), U.S. Pat. No. 5,764,763 (entitled "Apparatus and Methods for Including Codes in Audio Signals and Decoding," which issued on Jun. 9, 1998), U.S. Pat. No. 5,574,962 (entitled "Method and Apparatus for Automatically Identifying a Program Including a Sound Signal," which issued on Nov. 12, 1996), U.S. Pat. No. 5,581,800 (entitled "Method and Apparatus for Automatically Identifying a Program Including a Sound Signal," which issued on Dec. 3, 1996), U.S. Pat. No. 5,787,334 (entitled "Method and Apparatus for Automatically Identifying a Program Including a Sound Signal," which issued on Jul. 28, 1998), and U.S. Pat. No. 5,450,490 (entitled "Apparatus and Methods for Including Codes in Audio Signals and Decoding," which issued on Sep. 12, 1995, all of which are hereby incorporated by reference in their entireties.

Existing video watermarking techniques, on the other hand, involve embedding a code in a video component of the media content in a manner that can be detected by a suitably configured watermark-detection algorithm but that is masked from human visual detection.

Examples of video watermarking techniques include various spatial-domain techniques such as flipping pixels, embedding the watermark into least significant bits, and adding a pseudo-random noise pattern to the video, and various frequency-domain techniques, such as SVD domain watermarking, Discrete Fourier Transform watermarking, Discrete Cosine Transform watermarking, Discrete Wavelet Transform watermarking, and principal component analysis watermarking. Other examples are possible as well.

In line with the discussion above, when the content presentation device 300 is planning a dynamic content modification or is currently applying a dynamic content modification, a trigger event may occur that justifies having the content presentation device 300 abandon the dynamic content modification. In response to occurrence of the trigger event, the content delivery entity 304 could then use abandonment-watermark encoder 310 to encode an abandonment-watermark (e.g., audio and/or video based) into the media stream that is being delivered to the content presentation device 300. As the content presentation device 300 is receiving the media stream, the content presentation device 300 could then use abandonment-watermark decoder 312 to detect and read the abandonment-watermark from the media stream, and the content presentation device 300 could respond to detecting of the abandonment-watermark by abandoning the dynamic content modification.

In an example implementation, the trigger event for abandoning of the dynamic content modification could be a content-related event, perhaps an event related to the media content of the channel represented by the media stream that the content presentation device is receiving. Without limitation, examples of such an event as noted above could include (i) the presence or occurrence of emergency content, such as a breaking news report or an emergency alert, on the channel or (ii) a changing of the channel. Alternatively, the event might take other forms, not necessarily content-related.

Various entities could detect the occurrence of the trigger event so as to then cause the content delivery entity 304 to encode an abandonment-watermark into the media stream that is being delivered to the content presentation device 300. Further, an entity could detect the occurrence the trigger event directly or could detect occurrence of the trigger event by receiving signaling responsive to occurrence of the trigger event.

By way of example, an entity that inserts or otherwise provides emergency content on the channel that being delivered to the content presentation device 300 could implicitly detect the trigger event by engaging in the act of providing the emergency content on the channel.

This entity that provides the emergency content on the channel might be the content delivery entity 304 itself, such as a media content source or distributor, in which case the content delivery entity 304 would implicitly detect the occurrence of the trigger event by itself engaging in the act of providing the emergency content on the channel. The content delivery entity 304 could then responsively encode the abandonment-watermark into the media stream that is being delivered to the content presentation device 300.

Alternatively, another entity might provide the emergency content on the channel and might engage in associated signaling with the content delivery entity 304, to cause the content delivery entity 304 to responsively encode the abandonment-watermark into the media stream that is being delivered to the content presentation device 300. In this case, the other entity and/or the content delivery entity 304 might be involved with the detecting the occurrence of the trigger event. And the content delivery entity 304 could likewise encode the abandonment-watermark into the media stream that is being delivered to the content presentation device 300.

Still alternatively, the content delivery entity 304 or another entity in the path along which the media stream is being delivered to the content presentation device 300 could detect the presence of the emergency content in the media stream, by monitoring the media stream for the presence of one or more tones (e.g., EAS tones) and/or other audio signals indicative of emergency content in the media stream. And the entity could responsively encode or cause to be encoded the abandonment-watermark into the media stream.

Yet alternatively, the ACR server 308 could be involved with detecting the presence of emergency content in the media stream that is being delivered to the content presentation device 300, and the ACR server 308 could respond to detecting the presence of the emergency content by signaling to the content delivery entity 304 to cause the content delivery entity 304 to insert the abandonment-watermark into the media stream that is being delivered to the content presentation device 300.

For instance, in much the same way as the ACR server 308 could be provisioned with digital fingerprints representing modifiable content segments as discussed above, the ACR server 308 could be provisioned with digital reference fingerprints representing emergency content such as media content (e.g., tones) that would typically introduce a breaking news story or emergency alert. And the ACR server 308 could use these digital fingerprints as a basis to determine when this introductory emergency content is present in the media stream representing the channel of content en route to the content presentation device 300.

This introductory emergency content could be channel specific, such as specific to the channel that the ACR server 308 has determined the content presentation device 304 is rendering. For instance, for each of various known channels, the ACR server 308 could be provisioned with respective digital fingerprints representing media content that would typically introduce a breaking news story or emergency alert specifically on that channel. Once the ACR server 308 has identified the channel being rendered by the content presentation device 300 and has engaged in signaling with the content presentation device 300 to initiate a dynamic content modification on that channel, the ACR server 308 could thus select the associated digital fingerprints representing the introductory emergency content specifically for that channel, and the ACR server 308 could begin comparing the reference digital fingerprint data representing the identified channel with the digital fingerprints representing the introductory emergency content for the identified channel.

Upon finding a fingerprint match with sufficient certainty, the ACR server 308 could then reasonably conclude that emergency content is present on the channel en route to the content presentation device 300. And the ACR server could respond to the determined presence of the emergency content on the channel by signaling to the content delivery entity 304 to cause the content delivery entity 304 to encode the abandonment-watermark into the media stream being delivered to the content presentation device.

If the occurrence of emergency content on the channel is the trigger event for encoding of the abandonment-watermark into the media stream that is being delivered to the content presentation device 300, the content delivery entity 304 could optimally encode the abandonment-watermark into the media stream shortly before the time when the emergency content will appear on the channel. This could give the content presentation device 300 time to decode the abandonment-watermark and responsively abandon dynamic content modification by the time the emergency content will appear on the channel. Alternatively, the content delivery entity 304 could encode the abandonment-watermark to be coincident with the emergency content on the channel, such as by encoding the abandonment-watermark into the emergency content itself or into associated content on the channel, to facilitate triggering the abandonment at or near in time to when the emergency content will be presented.

Further, note that similar principles could apply with respect to the presence of other special content, aside from emergency content, on the channel that is being delivered to the content presentation device.

As another example, when a user changes the channel being rendered by the content presentation device 300, an entity that is involved with that channel change could detect the channel change as the trigger event, so as to then cause the content delivery entity 304 to encode an abandonment-watermark into the media stream that is being delivered to the content presentation device 300.

Analogously here, the entity that detects the channel change might be the content delivery entity 304 itself, such as a virtual-MVPD for instance, in which case the content delivery entity 304 could then responsively encode the abandonment-watermark into the media stream that is being delivered to the content presentation device 300. Alternatively, another entity that is aware of or otherwise involved with the channel change might detect the channel change and inform the content delivery entity 304 so as to cause the content delivery entity 304 to encode the abandonment-watermark into the media stream that is being delivered to the content presentation device 300.

For instance, a set top box that could tune to a user-selected channel and output that channel in a media stream being delivered to the content presentation device could detect when the user changes the channel, such as by receiving remote-control input changing the channel. The set top box could then respond to that channel change by encoding the abandonment-watermark into the media stream that is being delivered to the content presentation device 300.

Likewise, a streaming-media receiver that could establish a streaming-media session with a streaming-media server to receive a user-selected channel of content could detect when the user changes the channel, also by receiving remote-control input changing the channel. And the streaming-media receiver could similarly respond to that channel change by encoding the abandonment-watermark into the media stream that is being delivered to the content presentation device 300.

Alternatively, a virtual-MVPD (such as a streaming-media server) that could establish a streaming media session with a streaming-media receiver to deliver a user-selected channel of content could similarly detect when a channel change occurs, perhaps by receiving signaling from the streaming-media receiver requesting a change of the channel and/or establishment of a replacement channel stream. The virtual-MVPD could then similarly respond to that channel change by encoding the abandonment-watermark into the media stream that is being delivered to the content presentation device 300.

If the occurrence of a channel change is the trigger event for encoding of the abandonment-watermark into the media stream that is being delivered to the content presentation device 300, the content delivery entity 304 could optimally encode the abandonment-watermark into the media stream shortly before the time when the channel change will occur, such as by first encoding the abandonment-watermark and then proceeding with the channel change for instance. This could give the content presentation device 300 time to decode the abandonment-watermark and responsively abandon dynamic content modification by the time the channel changes.

As noted above, the content presentation device 300 could detect and respond to the abandonment-watermark at any time between when the abandonment-watermark within the media stream at any time between when the content presentation device 300 begins planning for a dynamic content modification and when the content presentation device 300 would finish carrying out the dynamic content modification.

In practice, for instance, once the content presentation device 300 has received signaling that causes the content presentation device 300 to plan for dynamic content modification at an upcoming content modification opportunity, the content presentation device 300 could responsively start to monitor the incoming media stream for the presence of an abandonment-watermark.

If the content presentation device 300 then detects the abandonment-watermark before the start of the content modification opportunity, the content presentation device 300 could responsively forgo the content modification altogether by not starting it.

Alternatively, if the content presentation device 300 is currently applying the content modification, such as currently presenting overlay or replacement content, when the content presentation device 300 detects the abandonment-watermark, the content presentation device could responsively discontinue the content modification. For instance, the content presentation device 300 could discontinue presentation of an overlay or replacement content that was underway, reverting to presentation of the unmodified content of the media stream.

Figure 4:
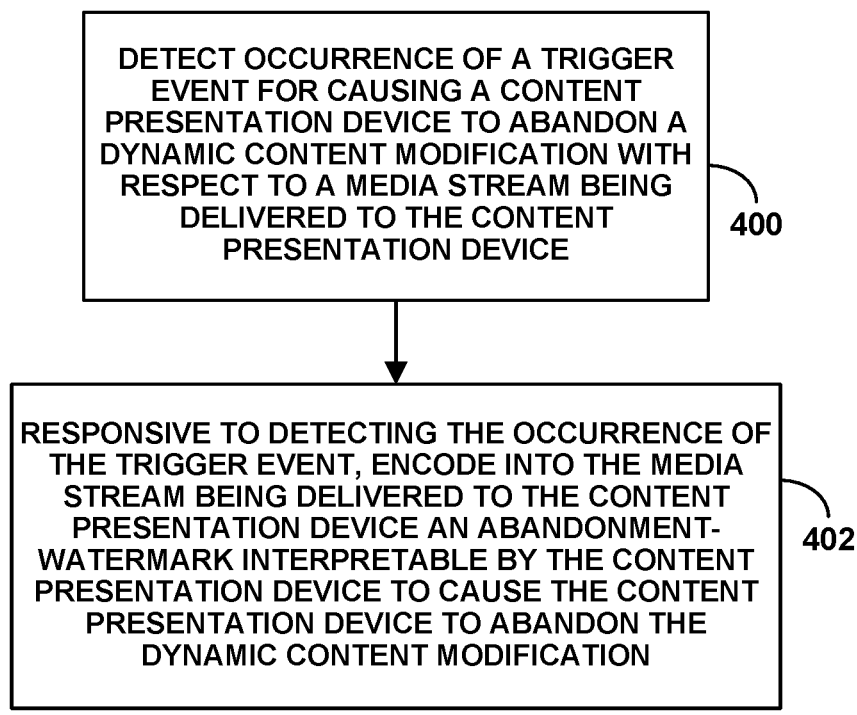
FIG. 4 is a flow chart depicting a method that can be carried out in accordance with the disclosure.

FIG. 4 is next a flow chart depicting a method that can be carried out in accordance with the present disclosure. As shown in FIG. 4, at block 400, the method includes detecting occurrence of a trigger event for causing a content presentation device to abandon a dynamic content modification with respect to a media stream being delivered to the content presentation device. And at block 402, the method includes, responsive to detecting the occurrence of the trigger event, encoding an abandonment-watermark into the media stream being delivered to the content presentation device, the abandonment-watermark being interpretable by the content presentation device to cause the content presentation device to abandon the dynamic content modification.

In line with the discussion above, this method could be carried out between a time when the content presentation device has received a directive to carry out the dynamic content modification (e.g., signaling providing information about an upcoming content modification opportunity) and a time when the content presentation device would start applying the dynamic content modification, in which case the act of abandoning the dynamic content modification could involve forgoing the dynamic content modification. Alternatively, the method could be carried out while the content presentation device is applying the dynamic content modification, in which case the act of abandoning the dynamic content modification could involve discontinuing the dynamic content modification.

As further discussed above, the dynamic content modification at issue in this method could be DAI. Further, the dynamic content modification could be responsive to fingerprint-based ACR, in the manner discussed above among other possibilities.

In addition, as discussed above, the trigger event for causing the content presentation device to abandon the dynamic content modification could be a content-related trigger event, such as the occurrence of emergency content in the media stream that is being delivered to the content presentation device or the occurrence of a channel change in the media stream that is being delivered to the content presentation device. Thus, detecting the trigger event could involve detecting presence of emergency content in the media stream that is being delivered to the content presentation device or detecting a change of channel represented by the media stream being delivered to the content presentation device.

Further, as discussed above, the act of detecting the trigger event could be carried out by at least one entity involved with delivering the media stream to the content presentation device, such as by a content delivery entity, an ACR server, and/or one or more other entities. And the act of encoding the abandonment-watermark into the media stream could likewise carried out by at least one entity involved with delivering the media stream to the content presentation device, such as by or on behalf of a content delivery entity.

Figure 5:
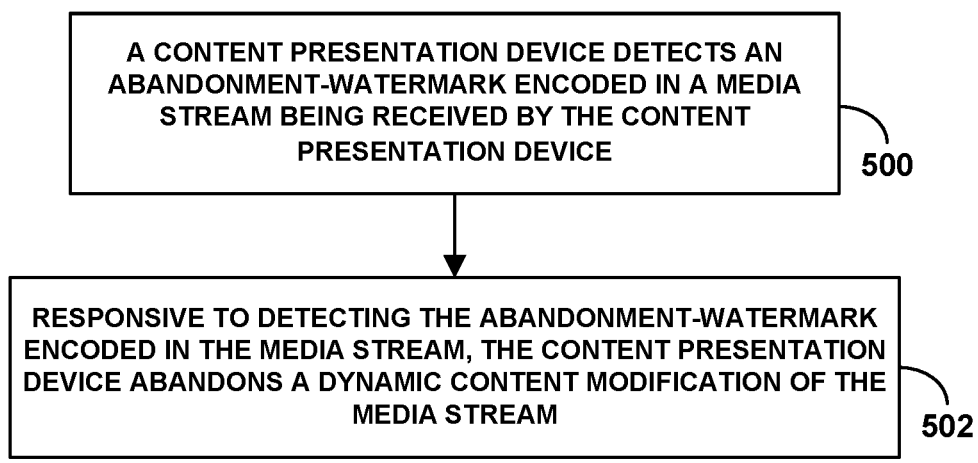
FIG. 5 is another flow chart depicting a method that can be carried out in accordance with the disclosure.

FIG. 5 is another flow chart depicting a method that can be carried out in accordance with the present disclosure. As shown in FIG. 5, at block 500, the method includes a content presentation device detecting an abandonment-watermark encoded in a media stream being received by the content presentation device. And at block 502, the method includes, responsive to detecting the abandonment-watermark encoded in the media stream, the content presentation device abandoning a dynamic content modification of the media stream.

In line with the discussion above, the act of detecting the abandonment-watermark encoded in the media stream being received by the content presentation device could involve detecting a watermark in the media stream and determining that the detected watermark encodes a value interpretable by the content presentation device to cause the content presentation device to abandon the dynamic content modification.

Various other features described above can be implemented in this context as well, and vice versa.

Figure 6:
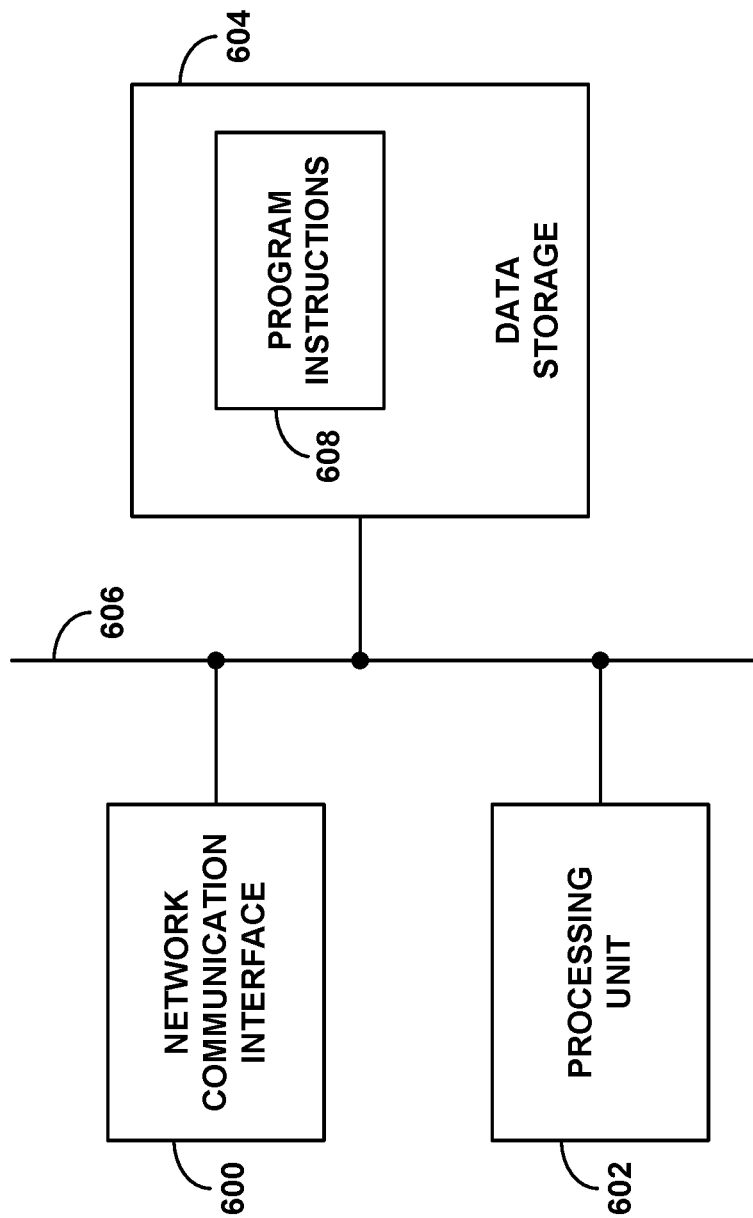
FIG. 6 is a simplified block diagram of an example system operable in accordance with the disclosure.

FIG. 6 is next a simplified block diagram of an example system operable in accordance with the present disclosure. This system could represent a content delivery entity as described above and/or one or more other entities. As shown in FIG. 6, the example system includes a network communication interface 600, a processing unit 602, non-transitory data storage 604, any or all of which could be integrated together or, as shown, communicatively linked together by a system bus, network, or other connection mechanism 606.

Network communication interface 600 could comprise one or more physical network connection mechanisms to facilitate communication on a network, and/or for engaging in direct or networked communication with one or more other local or remote entities. As such, the network communication interface could comprise a wireless or wired Ethernet interface or other type of network interface, for engaging in IP communication and/or other type of network communication.

Processing unit 602, could comprise one or more general purpose processors (e.g., microprocessors) and/or one or more specialized processors (e.g., application specific integrated circuits). And non-transitory data storage 606 could comprise one or more volatile and/or non-volatile storage components, such as optical, magnetic, or flash storage.

As shown, the data storage 604 of the example system stores program instructions 608, which could be executable by processing unit 602 to carry out various operations described herein. For instance, the operations could include (i) detecting occurrence of a trigger event for causing a content presentation device to abandon a dynamic content modification with respect to a media stream being delivered to the content presentation device, and (ii) responsive to detecting the occurrence of the trigger event, encoding an abandonment-watermark into the media stream being delivered to the content presentation device, the abandonment-watermark being interpretable by the content presentation device to cause the content presentation device to abandon the dynamic content modification.

Various features described above could be implemented in this context as well, and vice versa.

Figure 7:
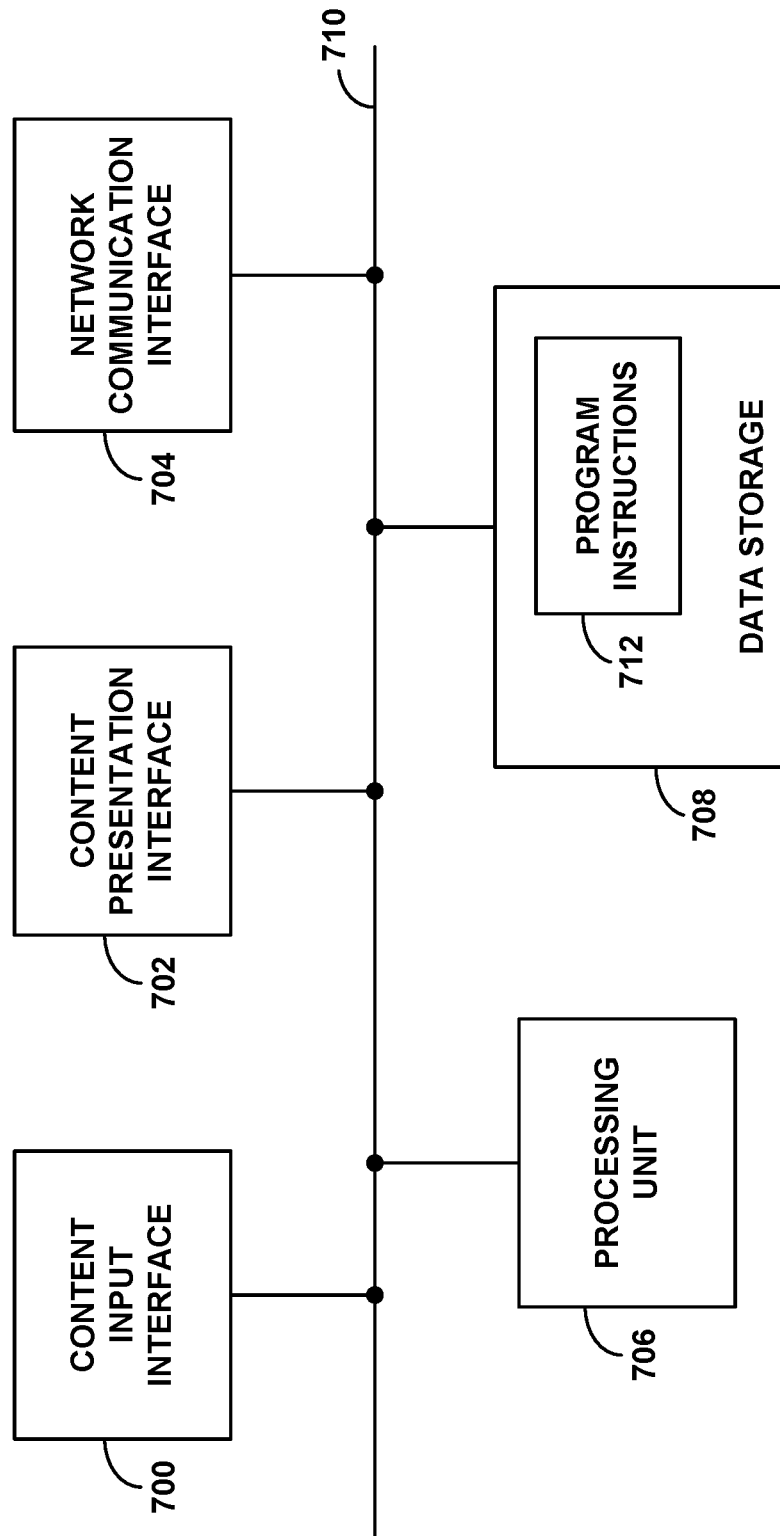
FIG. 7 is a simplified block diagram of an example content presentation device operable in accordance with the disclosure.

Finally, FIG. 7 is a simplified block diagram of an example content presentation device operable in accordance with the present disclosure. In line with the discussion above, this content presentation device could take various forms. For instance, it could be a television, computer monitor, or other device that operates to receive and render video content, and/or it could be a loudspeaker, a pair of headphones, or other device that operates to receive and render audio content. Numerous other examples are possible as well.

As shown in FIG. 7, the example content presentation device includes a content input interface 700, a content presentation interface 702, a network communication interface 704, a processing unit 706, and non-transitory data storage 708, any or all of which could be integrated together or, as shown, communicatively linked together by a system bus, network, or other connection mechanism 710.

Content input interface 700 could comprise a physical communication interface for receiving media content to be presented by the content presentation device. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others.

Content presentation interface 702 could then comprise one or more components to facilitate presentation of the received media content. By way of example, the media presentation interface could comprise a user interface such as a display screen and/or a loudspeaker, as well as one or more drivers or other components for processing the received media content to facilitate presentation of the content on the user interface.

Network communication interface 704 could comprise a physical network connection mechanism to facilitate communication on a network, and/or for engaging in direct or networked communication with one or more other local or remote entities. As such, the network communication interface could comprise a wireless or wired Ethernet interface or other type of network interface, for engaging in IP communication and/or other type of network communication.

Processing unit 706 could then comprise one or more general purpose processors (e.g., microprocessors) and/or one or more specialized processors (e.g., application specific integrated circuits). And non-transitory data storage 708 could comprise one or more volatile and/or non-volatile storage components, such as optical, magnetic, or flash storage. Further, as shown, data storage 708 stores program instructions 712, which could be executable by processing unit 606 to carry out various operations described here.

Various features described above could be implemented in this context as well, and vice versa.

Further, the present disclosure also contemplates a non-transitory computer readable medium that is encoded with, stores, or otherwise embodies program instructions executable by a processing unit to carry out various operations as described herein.

Exemplary embodiments have been described above. Those skilled in the art will understand, however, that changes and modifications may be made to these embodiments without departing from the true scope and spirit of the invention.

What is claimed is:

1. A method comprising:
    detecting occurrence of a trigger event for causing a content presentation device to abandon a dynamic content modification with respect to a media stream being delivered to the content presentation device, wherein the detecting the occurrence of the trigger event comprises detecting presence of emergency content in the media stream that is being delivered to the content presentation device; and
    responsive to detecting the occurrence of the trigger event, encoding an abandonment-watermark into the media stream coincident with the detected emergency content in the media stream being delivered to the content presentation device, wherein the abandonment-watermark is interpretable by the content presentation device to cause the content presentation device to abandon the dynamic content modification.

2. The method of claim 1, wherein the method is carried out between a time when the content presentation device has received a directive to carry out the dynamic content modification and a time when the content presentation device would start applying the dynamic content modification, and wherein abandoning the dynamic content modification comprises forgoing the dynamic content modification.

3. The method of claim 1, wherein the method is carried out while the content presentation device is applying the dynamic content modification, and wherein abandoning the dynamic content modification comprises discontinuing the dynamic content modification.

4. The method of claim 1, wherein the dynamic content modification comprises dynamic ad insertion.

5. The method of claim 1, wherein the dynamic content modification is responsive to fingerprint-based automatic content recognition.

6. The method of claim 1, wherein detecting the presence of emergency content in the media stream that is being delivered to the content presentation device comprises detecting in the media stream one or more predefined audio signals indicative of presence of the emergency content in the media stream.

7. The method of claim 1, wherein detecting the trigger event is carried out by at least one entity involved with delivering the media stream to the content presentation device.

8. The method of claim 1, wherein encoding the abandonment-watermark into the media stream is carried out by at least one entity involved with delivering the media stream to the content presentation device.

9. The method of claim 6, wherein detecting in the media stream the one or more audio signals indicative of presence of the emergency content in the media stream comprises detecting in the media stream one or more Emergency Alert System tones.

10. A system comprising:
    a network communication interface;
    a processing unit;
    non-transitory data storage; and
    program instructions stored in the non-transitory data storage and executable by the processing unit to carry out operations including:
        detecting occurrence of a trigger event for causing a content presentation device to abandon a dynamic content modification with respect to a media stream being delivered to the content presentation device, wherein the detecting the occurrence of the trigger event comprises detecting presence of emergency content in the media stream that is being delivered to the content presentation device, and
        responsive to detecting the occurrence of the trigger event, encoding an abandonment-watermark into the media stream coincident with the detected emergency content in the media stream being delivered to the content presentation device, wherein the abandonment-watermark is interpretable by the content presentation device to cause the content presentation device to abandon the dynamic content modification.

11. The system of claim 10, wherein the program instructions are executable to carry out the operations between a time when the content presentation device has received a directive to carry out the dynamic content modification and a time when the content presentation device would start applying the dynamic content modification, and wherein abandoning the dynamic content modification comprises forgoing the dynamic content modification.

12. The system of claim 10, wherein the program instructions are executable to carry out the operations while the content presentation device is applying the dynamic content modification, and wherein abandoning the dynamic content modification comprises discontinuing the dynamic content modification.

13. The system of claim 10, wherein the dynamic content modification comprises dynamic ad insertion.

14. The system of claim 10, wherein the dynamic content modification is responsive to fingerprint-based automatic content recognition.

15. The system of claim 10, wherein detecting the presence of emergency content in the media stream that is being delivered to the content presentation device comprises detecting in the media stream one or more predefined audio signals indicative of presence of the emergency content in the media stream.

16. The system of claim 10, wherein the system is disposed at least in part at an entity involved with delivering the media stream to the content presentation device.

17. The system of claim 15, wherein detecting in the media stream the one or more audio signals indicative of presence of the emergency content in the media stream comprises detecting in the media stream one or more Emergency Alert System tones.

18. A non-transitory computer-readable medium embodying program instructions executable by one or more processors to carry out operations comprising:
    detecting occurrence of a trigger event for causing a content presentation device to abandon a dynamic content modification with respect to a media stream being delivered to the content presentation device, wherein the detecting occurrence of the trigger event comprises detecting presence of emergency content in the media stream that is being delivered to the content presentation device; and responsive to detecting the occurrence of the trigger event, encoding an abandonment-watermark into the media stream coincident with the detected emergency content in the media stream being delivered to the content presentation device, wherein the abandonment-watermark is interpretable by the content presentation device to cause the content presentation device to abandon the dynamic content modification.

19. The non-transitory computer-readable medium of claim 18, wherein the program instructions are executable to carry out the operations between a time when the content presentation device has received a directive to carry out the dynamic content modification and a time when the content presentation device would start applying the dynamic content modification, and wherein abandoning the dynamic content modification comprises forgoing the dynamic content modification.

20. The non-transitory computer-readable medium of claim 18, wherein the program instructions are executable to carry out the operations while the content presentation device is applying the dynamic content modification, and wherein abandoning the dynamic content modification comprises discontinuing the dynamic content modification.

* * * * *